US012192764B2

(12) United States Patent
Rajput et al.

(10) Patent No.: US 12,192,764 B2
(45) Date of Patent: Jan. 7, 2025

(54) METHODS, SYSTEMS, AND COMPUTER READABLE MEDIA FOR DELEGATED AUTHORIZATION AT SECURITY EDGE PROTECTION PROXY (SEPP)

(71) Applicant: Oracle International Corporation, Redwood Shores, CA (US)

(72) Inventors: Jay Rajput, Bangalore (IN); Virendra Singh, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 552 days.

(21) Appl. No.: 17/198,740

(22) Filed: Mar. 11, 2021

(65) Prior Publication Data

US 2022/0295282 A1 Sep. 15, 2022

(51) Int. Cl.
*H04W 12/084* (2021.01)
*H04L 9/40* (2022.01)
(Continued)

(52) U.S. Cl.
CPC ....... *H04W 12/084* (2021.01); *H04L 63/0281* (2013.01); *H04L 67/56* (2022.05); *H04W 8/18* (2013.01); *H04W 84/042* (2013.01)

(58) Field of Classification Search
CPC ... H04W 12/084; H04W 8/18; H04W 84/042; H04W 92/02; H04L 63/0281; H04L 67/56; H04L 63/0884; H04L 63/0807
See application file for complete search history.

(56) References Cited

U.S. PATENT DOCUMENTS 7,512,973 B1 * 3/2009 Chan ................ H04L 63/10
726/8
11,032,270 B1 * 6/2021 Tsarfati ............ H04L 63/0281
(Continued)

FOREIGN PATENT DOCUMENTS

EP 3 955 515 A1 2/2022
WO WO 2020/208913 A1 10/2020
(Continued)

OTHER PUBLICATIONS

Notification of Transmittal of the International Search Report and the Written Opinion of the International Searching Authority, or the Declaration for International Application No. PCT/US2022/014087 (Apr. 14, 2022).
(Continued)

*Primary Examiner* — Fatoumata Traore
*Assistant Examiner* — Carlton Johnson
(74) *Attorney, Agent, or Firm* — Jenkins, Taylor & Hunt, P.A.

(57) ABSTRACT

A method for delegated authorization at a security edge protection proxy (SEPP) includes intercepting, from a consumer network function (NF) that does not support access token based authorization, a service based interface (SBI) service request for accessing a service provided by a producer NF that requires access token based authorization. The method further includes operating as an access token authorization client to obtain a first access token on behalf of the consumer NF. The method further includes using the first access token to enable the consumer NF to access the service provided by the first producer NF. The SEPP may also operate as an access token authorization server on behalf of an NRF that does not support access-token-based authorization.

16 Claims, 11 Drawing Sheets

(51) Int. Cl.
*H04L 67/56* (2022.01)
*H04W 8/18* (2009.01)
*H04W 84/04* (2009.01)

(56) References Cited

U.S. PATENT DOCUMENTS

| | | | |
|---|---|---|---|
| 11,641,356 B2* | 5/2023 | Fujii | G06F 21/6218 726/4 |
| 11,811,747 B2 | 11/2023 | Singh et al. | |
| 2020/0127994 A1* | 4/2020 | Kukreja | G06F 21/31 |
| 2021/0297942 A1 | 9/2021 | S Bykampadi et al. | |
| 2022/0086734 A1 | 3/2022 | Aggarwal et al. | |
| 2022/0201487 A1 | 6/2022 | Minokuchi et al. | |
| 2022/0294775 A1 | 9/2022 | Singh et al. | |

FOREIGN PATENT DOCUMENTS

| WO | WO 2020/221956 A1 | 11/2020 |
|---|---|---|
| WO | WO 2022/191932 A1 | 9/2022 |

OTHER PUBLICATIONS

Notification of Transmittal of the International Search Report and the Written Opinion of the International Searching Authority, or the Declaration for International Application No. PCT/US2022/014084 (Apr. 14, 2022).

Nokia et al., "Re-using of access token in indirect communication with delegated discovery," 3GPP TSG-SA3 Meeting#101-e, pp. 1-4 (Nov. 9, 2020 to Nov. 20, 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

Fielding et al., "Hypertext Transfer Protocol (HTTP/1.1): Semantics and Content," Internet Engineering Task Force (IETF), RFC 7231, pp. 1-102 (Jun. 2014).

Hardt, "The OAuth 2.0 Authorization Framework," Internet Engineering Task Force (IETF), RFC 6749, pp. 1-77 (Oct. 2012).

Commonly-Assigned, Co-pending U.S. Appl. No. 17/198,815 for "Methods, Systems, and Computer Readable Media for Delegated Authorization at Service Communications Proxy (SCP)," (Unpublished, filed Mar. 11, 2021).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

Notice of Allowance and Fee(s) Due/Examiner Initiated Interview Summary for U.S. Appl. No. 17/198,815 (Jul. 10, 2023).

Non-Final Office Action for U.S. Appl. No. 17/198,815 (Mar. 16, 2023).

* cited by examiner

METHODS, SYSTEMS, AND COMPUTER READABLE MEDIA FOR DELEGATED AUTHORIZATION AT SECURITY EDGE PROTECTION PROXY (SEPP)

TECHNICAL FIELD

The subject matter described herein relates to network security and inter-public land mobile network (PLMN) compatibility. More particularly, the subject matter described herein relates to methods, systems, and computer readable media for delegated authorization at a SEPP.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when one public PLMN or network function supports OAuth 2.0 authorization and another PLMN or network function does not support OAuth 2.0 authorization. According to the OAuth 2.0 authorization framework specified in Internet Engineering Task Force (IETF) request for comments (RFC) 6749, an authorization client seeking to access a protected resource available from a resource server first obtains an access token from an authorization server. After the client obtains the access token, the client sends a service request to the resource server. The resource server verifies the access token and provides access to the protected resource.

In the context of 5G communications networks, the NF service consumer functions as the OAuth 2.0 resource client, the NF service producer functions as the OAuth 2.0 resource server, and the NRF functions as the authorization server. Thus, an NF service consumer seeking to access a service provided by an NF service producer signals with the NRF to obtain an access token to access the resource provided by the NF service producer. After the NF service consumer obtains the access token from the NRF, the NF service consumer sends a service request to the NF service producer, where the service request includes the access token. The NF service producer validates the access token and provides access to the service requested by the NF service consumer.

While the OAuth 2.0 authorization framework works to provide authorization in 5G communications networks, if a service request is sent from a consumer NF that does not support OAuth 2.0 authorization to a producer NF that requires an OAuth 2.0 access token, the service request will be denied. Similarly, if a consumer NF that supports OAuth 2.0 authorization sends an access token request to an NRF that does not support OAuth 2.0 authorization, the requesting consumer NF will not be able to obtain an access token.

These types of incompatibility issues may occur when the PLMN of the service consumer supports OAuth 2.0 authorization, and the PLMN of the service producer does not support OAuth 2.0 authorization or vice-versa. These types of incompatibility issues may also occur when an NF from one vendor supports OAuth 2.0 authorization and an NF from another vendor does not support OAuth 2.0 authorization.

In light of these and other difficulties, there exists a need for a method for improved interoperability between network functions when an OAuth 2.0 authorization incompatibility exists.

SUMMARY

A method for delegated authorization at a security edge protection proxy (SEPP) includes intercepting, from a first consumer network function (NF) that does not support access-token-based authorization, a first service based interface (SBI) service request for accessing a service provided by a first producer NF that requires access-token-based authorization. The method further includes operating as an access token authorization client proxy to obtain a first access token on behalf of the first consumer NF. The method further includes using the first access token to enable the first consumer NF to access the service provided by the first producer NF.

According to another aspect of the subject matter described herein, operating as an access token authorization client proxy includes signaling with an NF repository function (NRF) to obtain the first access token.

According to another aspect of the subject matter described herein, signaling with the NRF to obtain the first access token includes: generating an access token request on behalf of the first consumer NF; transmitting the access token request to the NRF; and receiving, from the NRF, an access token response including the first access token.

According to another aspect of the subject matter described herein, generating the access token request includes extracting values for at least some attributes to be included in the access token request from a user agent header of the first SBI service request.

According to another aspect of the subject matter described herein, extracting values for at least some of the attributes includes extracting an NF instance ID of the first consumer NF from the user agent header of the first SBI service request.

According to another aspect of the subject matter described herein, using the first access token to enable the first consumer NF to access the service provided by the first producer NF includes: inserting the first access token in the first SBI service request; forwarding the first SBI service request including the first access token to the first producer NF; receiving an SBI service response from the first producer NF; and forwarding the SBI service response to the first consumer NF.

According to another aspect of the subject matter described herein, the method for delegated authorization at an SEPP includes receiving, from a second consumer NF, an access token request; operating as an access token authorization server proxy on behalf of an NF repository function (NRF) that does not support access token authorization in response to the access token request from the second consumer NF; and signaling with the second consumer NF and a second producer NF to enable the second consumer NF to access a service provided by the second producer NF.

According to another aspect of the subject matter described herein, operating as an access token authorization server proxy comprises: generating, in response to the access token request, a second access token; and transmitting, to the second consumer NF, an access token response including the second access token.

According to another aspect of the subject matter described herein, signaling with the second producer NF to enable the second consumer NF to access the service provided by the second producer NF includes: receiving, from the second consumer NF, a second SBI service request including the second access token; removing the second access token from the second SBI service request; forwarding the second SBI service request to the second producer NF; receiving an SBI service response from the second producer NF; and forwarding the SBI service response to the second consumer NF.

According to another aspect of the subject matter described herein, generating the second access token includes generating an OAuth 2.0 access token comprising a dummy access token with syntactically correct claims.

According to another aspect of the subject matter described herein, A system for delegated authorization at a security edge protection proxy (SEPP) is provided. The system includes a SEPP including at least one processor and a memory. The system further includes an access token authorization client proxy implemented by the at least one processor for intercepting, from a first consumer network function (NF) that does not support access-token-based authorization, a first service based interface (SBI) service request for accessing a service provided by a first producer NF that requires access-token-based authorization, operating as an access token authorization client to obtain a first access token on behalf of the first consumer NF, and using the first access token to enable the first consumer NF to access the service provided by the first producer NF.

According to another aspect of the subject matter described herein, the access token authorization client proxy is configured to signal with an NF repository function (NRF) to obtain the first access token.

According to another aspect of the subject matter described herein, the access token authorization client proxy is configured to signal with the NRF to obtain the first access token by: generating an access token request on behalf of the first consumer NF; transmitting the access token request to the NRF; and receiving, from the NRF, an access token response including the first access token.

According to another aspect of the subject matter described herein, the access token authorization client proxy is configured to generate the access token request by extracting values for at least some attributes to be included in the access token request from a user agent header of the first SBI service request.

According to another aspect of the subject matter described herein, the values extracted by the access token authorization client proxy include an NF instance ID of the first consumer NF from the user agent header of the first SBI service request.

According to another aspect of the subject matter described herein, the access token authorization client proxy is configured to use the first access token to enable the first consumer NF to access the service by: inserting the first access token in the first SBI service request; forwarding the first SBI service request including the first access token to the first producer NF; receiving an SBI service response from the first producer NF; and forwarding the SBI service response to the first consumer NF.

According to another aspect of the subject matter described herein, the system for delegated authorization at an SEPP includes an access token authorization server proxy for receiving, from a second consumer NF, an access token request; operating as an access token authorization server on behalf of an NF repository function (NRF) that does not support access token authorization in response to the access token request from the second consumer NF; and signaling with the second consumer NF and a second producer NF to enable the second consumer NF to access a service provided by the second producer NF.

According to another aspect of the subject matter described herein, the access token authorization server proxy, in operating as the access token authorization server, is configured to: generate, in response to the access token request, a second access token; and transmit, to the second consumer NF, an access token response including the second access token.

According to another aspect of the subject matter described herein, the access token authorization server proxy is configured to signal with the second consumer NF and the second producer NF to enable the second consumer NF to access the service provided by the second producer NF by: receiving, from the second consumer NF, a second SBI service request including the second access token; removing the second access token from the second SBI service request; forwarding the SBI service request to the second producer NF; receiving an SBI service response from the second producer NF; and forwarding the SBI service response to the second consumer NF.

According to another aspect of the subject matter described herein, a non-transitory computer readable medium having stored thereon executable instructions that when executed by a processor of a computer controls the computer to perform steps is provided. The steps include, intercepting, from a consumer network function (NF) that does not support access token based authorization, a service based interface (SBI) service request for accessing a service provided by a producer NF that requires access token based authorization. The steps further include operating as an access token authorization client proxy to obtain a first access token on behalf of the first consumer NF. The steps further include using the first access token to enable the consumer NF to access the service provided by the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
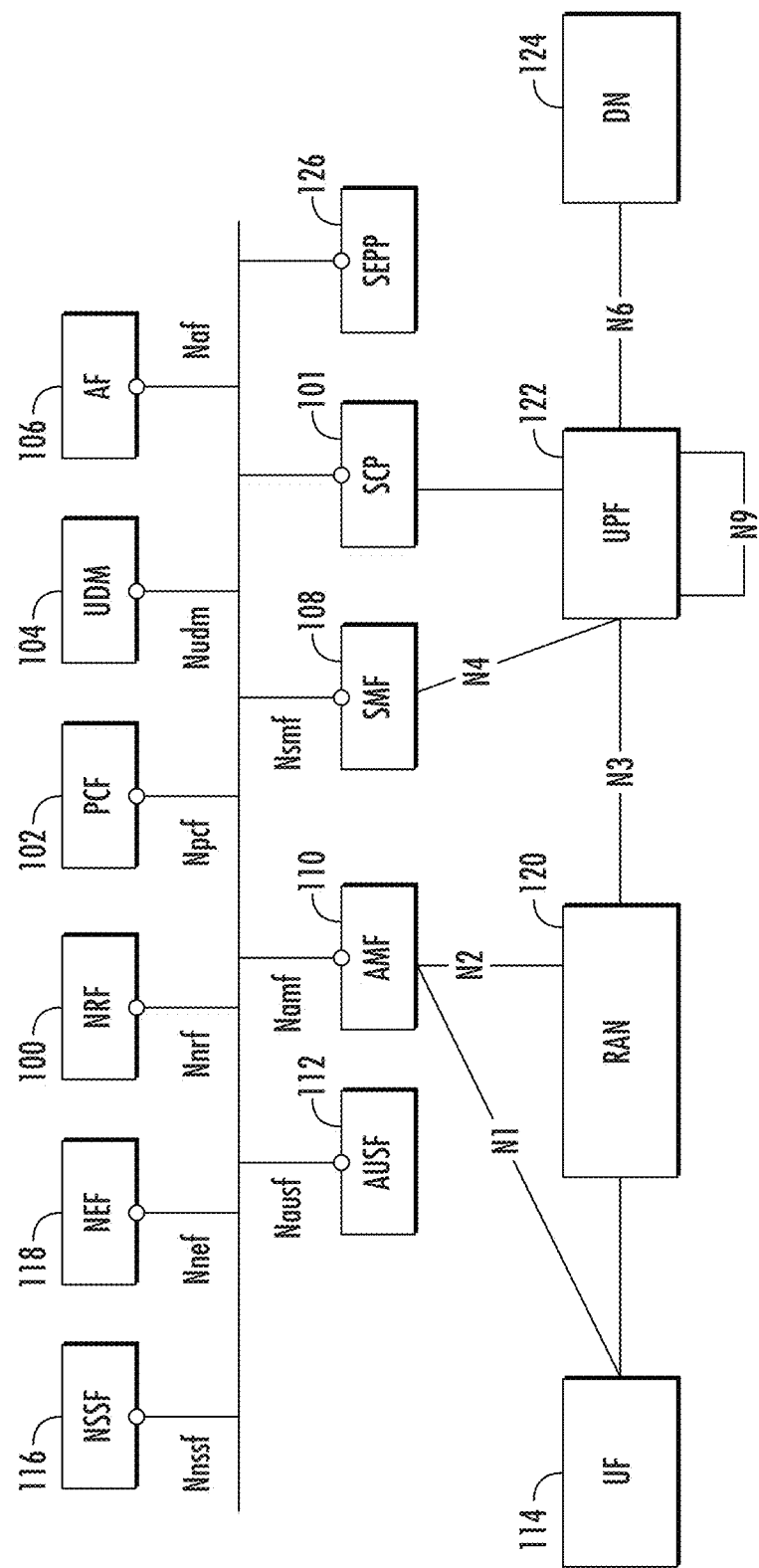
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a UDM function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
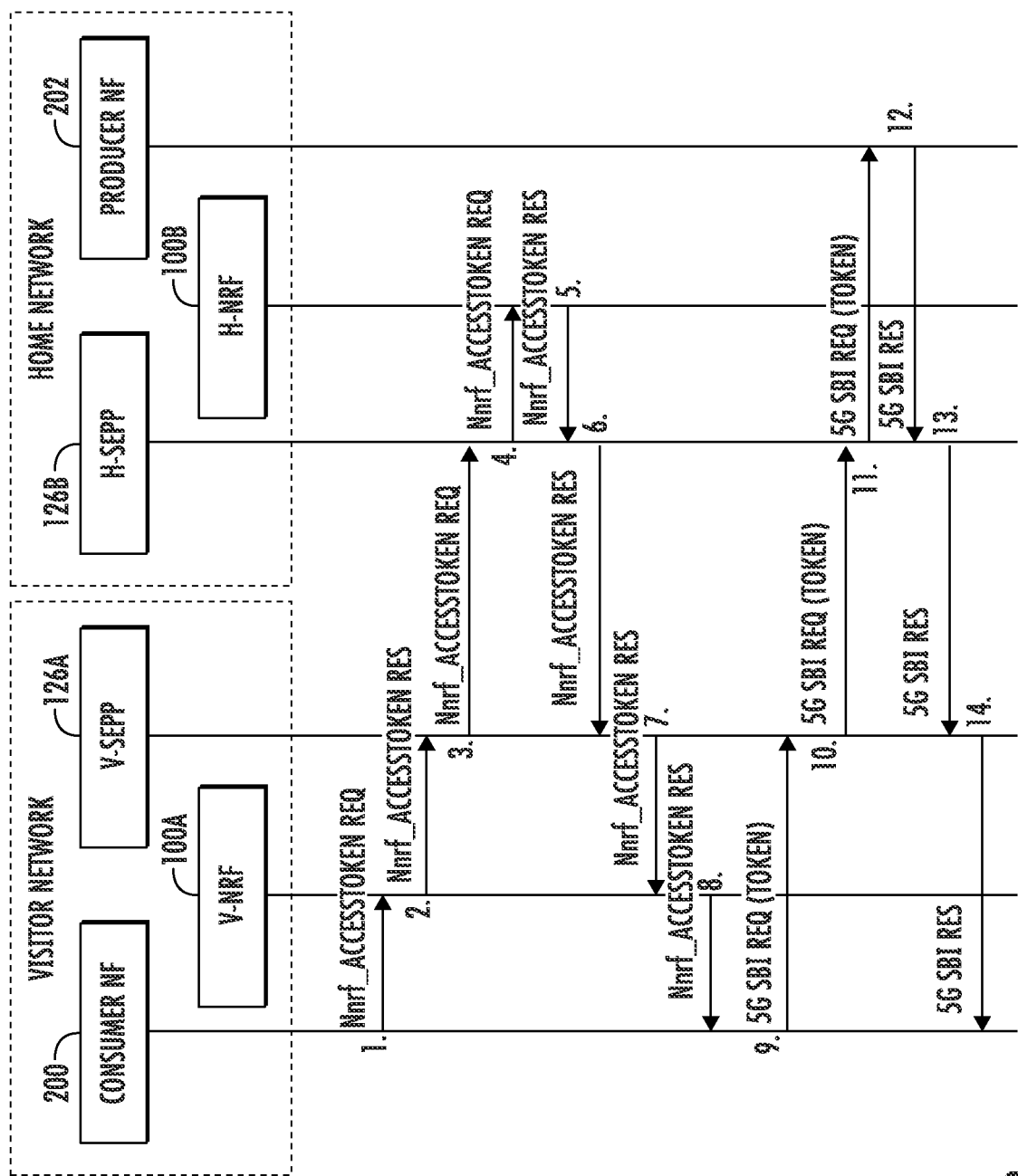
FIG. 2 is a message flow diagram illustrating exemplary messages exchanged in accessing a service in a 5G communications network using the OAuth 2.0 authorization framework.

As described above, one problem that can occur in 5G networks is lack of universal support for OAuth 2.0 authorization, which can result in service incompatibility between networks. FIG. 2 is a message flow diagram illustrating OAuth 2.0 authorization between PLMNs and the use of an access token to access a service across a PLMN boundary. Referring to the message flow in FIG. 2, in line 1, a consumer NF 200 sends an in NRF access token request message to NRF 100A located in the visitor network. NRF 100A forwards the access token request message to remote NRF 100B via SEPPs 126A and 126B. This forwarding is indicated by lines 2-4 in FIG. 2.

In line 5, home NRF 100B determines whether the client is authorized to receive an access token and returns an access token by transmitting an access token response message. In lines 5-7, the access token response message is communicated to consumer NF 200.

In line 9, consumer NF 200 generates an SBI service request message including the access token and sends the SBI service request message to producer NF 202 via SEPPs 126A and 126B, as indicated by lines 9-11.

Producer NF 202 validates the access token and grants consumer NF 200 access to the service. In lines 12-14, producer NF 202 returns an SBI service response message to consumer NF 200. Thus, FIG. 2 illustrates the case where two different networks support OAuth 2.0 authorization and, as a result, the access token messaging and service request messaging are successful. However, if one or the other network does not support OAuth 2.0 authorization, the service request and/or access token messaging will not be successful.

Figure 3:
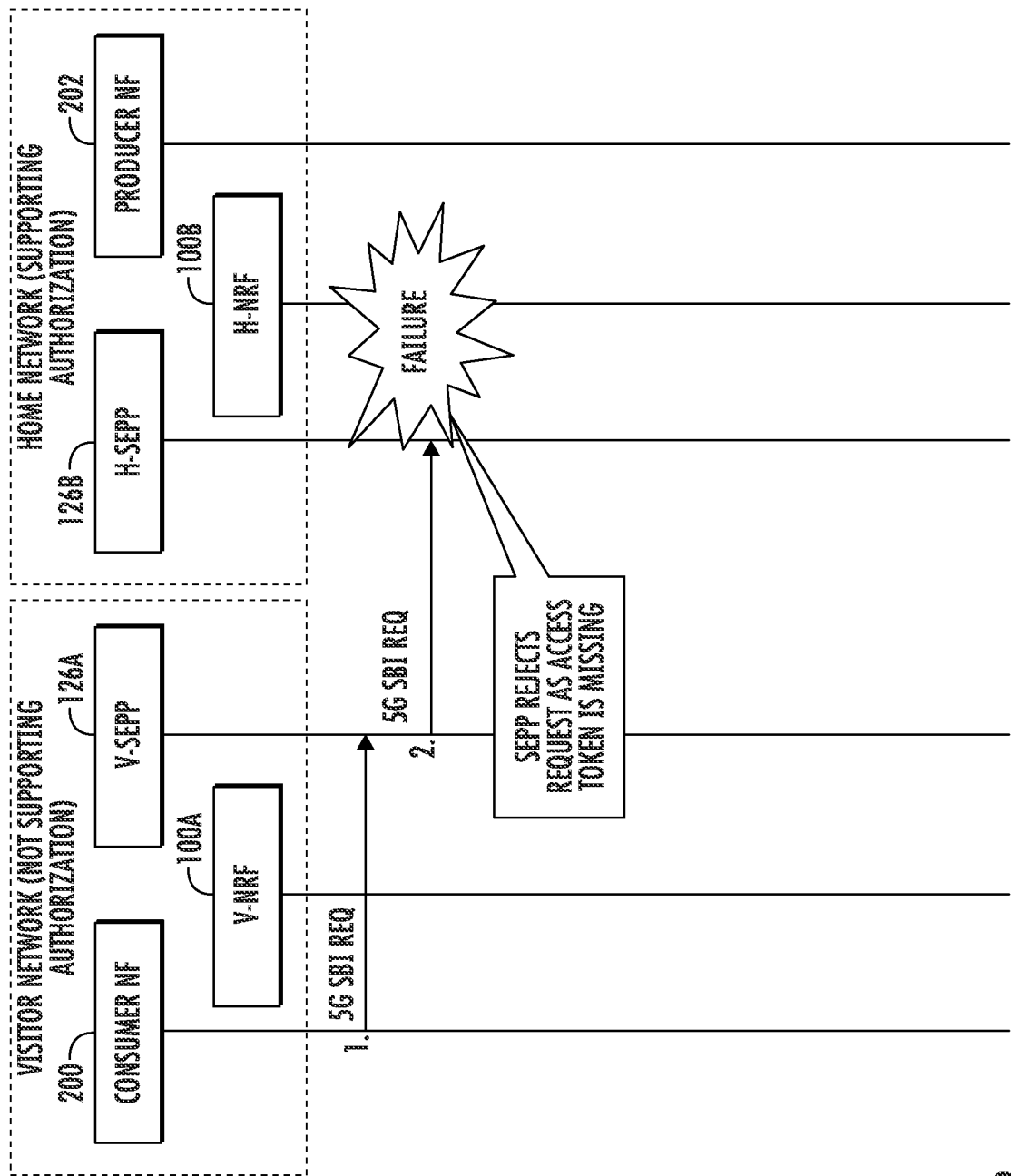
FIG. 3 is a message flow diagram illustrating exemplary messages exchanged when a consumer NF does not support OAuth 2.0 authorization and a producer NF requires OAuth 2.0 authorization as a condition to allowing access to a service provided by the producer NF.

FIG. 3 illustrates the case where the NF service consumer does not support OAuth 2.0 authorization, and the NF service producer requires OAuth 2.0 authorization. Referring to FIG. 3, in line 1, consumer NF 200 sends an SBI service request message to producer NF 202 located in a different PLMN and that requires access token authorization. Because the service request does not include an access token, the service request in line 2 is rejected by home SEPP 126B. SEPP 126B rejects the service request because 3GPP TS 33.501, section 13.4.1.2.2 suggests that the provider SEPP shall check that the serving PLMN of the subject claim in the access token matches the remote PLMN corresponding to the N32-f context ID in the N32 message. Because the service request message in line 2 does not include an access token, there is no subject claim for SEPP 126B to validate, and thus the message is rejected.

Figure 4:
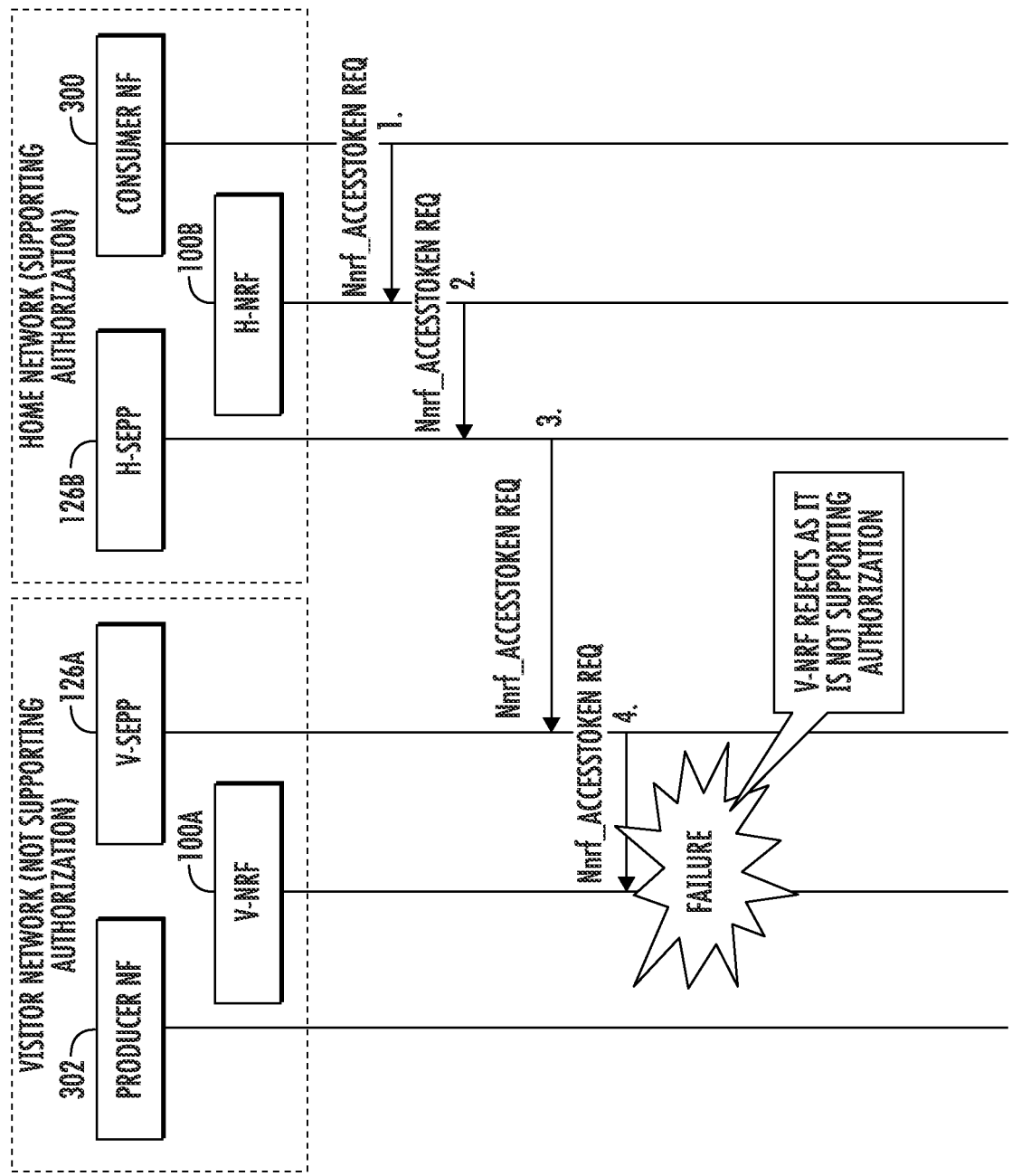
FIG. 4 is a message flow diagram illustrating exemplary messages exchanged when a consumer NF supports OAuth 2.0 authorization and an NRF does not support OAuth 2.0 authorization.

While FIG. 3 illustrates the case where the consumer NF does not support OAuth 2.0 authorization, and the producer NF supports OAuth 2.0 authorization, FIG. 4 illustrates the case where the consumer NF supports OAuth 2.0 authorization, and the NRF does not. Referring to the message flow in FIG. 4, in line 1, a consumer NF 300, which in this example is located in the home network, sends an access token request message to NRF 100B located in the home network in order to access a service provided by producer NF 302 located in the home network. NRF 100B forwards the access token request message to remote NRF 100A located in the visitor network. This forwarding is indicated by lines 2-4 of the message flow diagram in FIG. 4. In this example, visitor NRF 100A does not support OAuth 2.0 authorization. Accordingly, visitor NRF 100A cannot respond to the access token request, which results in failure of the access token messaging. As a result, consumer NF 300 may be unable to access services provided by producer NF 302 in the visitor network.

In order to avoid these difficulties, the SEPP described herein functions as an access token authorization client proxy on behalf of consumer NFs that do not support access-token-based authorization and as an access token authorization server on behalf of NRFs that do not support access-token-based authorization. For consumer NFs not supporting access-token-based authorization, the SEPP fetches the access token and adds the access token to SBI requests before forwarding the requests to the producer NF. The SEPP can choose to cache the token to speed up processing. The SEPP may utilize fields from the user agent header provided by the consumer NF in the SBI service request to obtain the NF type and the NF instance ID used to create the access token request on behalf of the consumer NF. When the SEPP functions as an OAuth 2.0 authorization server, the SEPP issues an access token to the requesting consumer NF.

Figure 5:
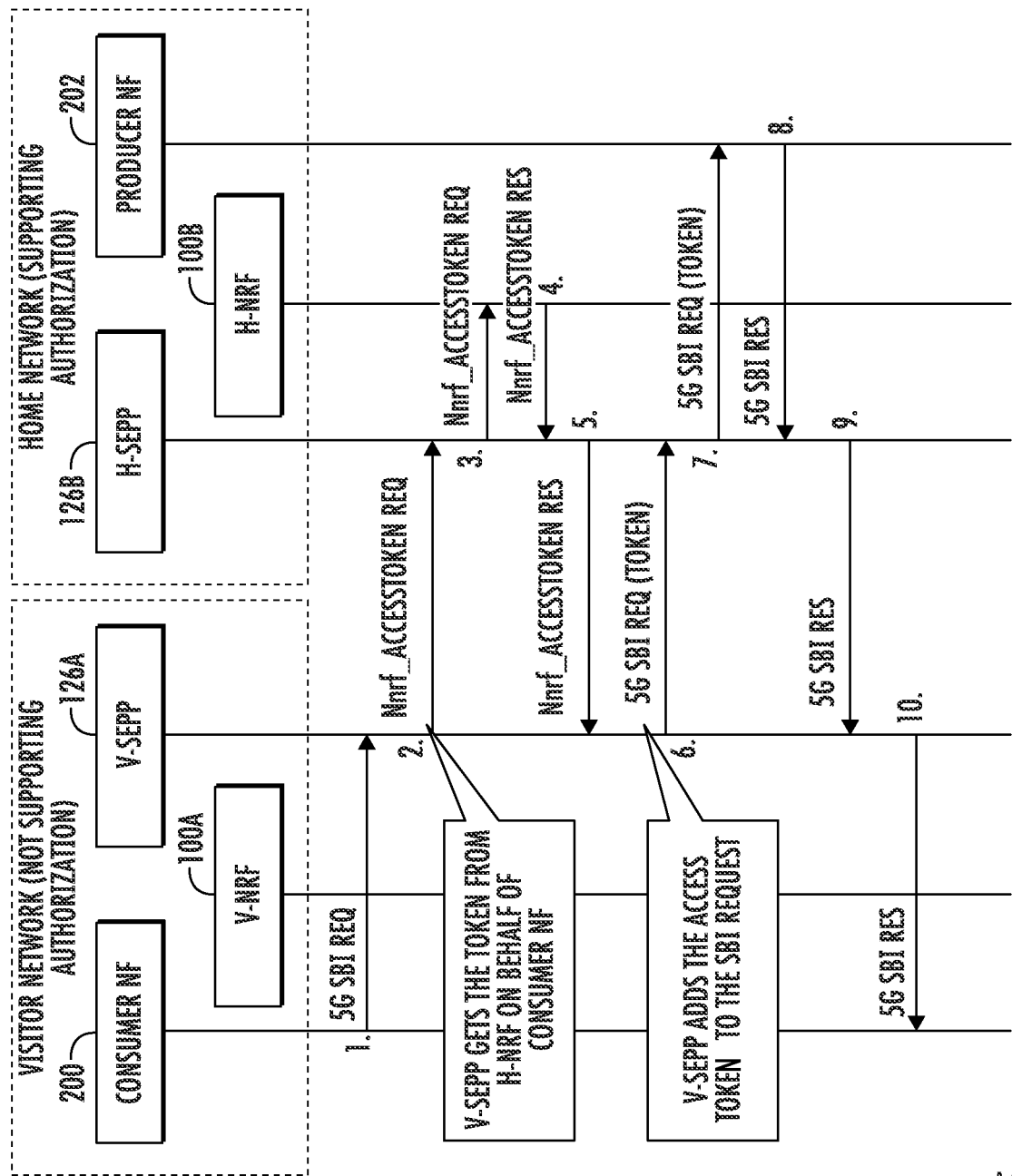
FIG. 5 is a message flow diagram illustrating delegated OAuth 2.0 authorization when a SEPP operates as an OAuth 2.0 authorization client proxy on behalf of a consumer NF that does not support OAuth 2.0 authorization.

FIG. 5 illustrates the case where the SEPP acts as an OAuth 2.0 authorization client proxy on behalf of a consumer NF that does not support OAuth 2.0 authorization. Referring to FIG. 5, in line 1 of the message flow diagram, consumer NF 200 sends an SBI service request message to producer NF 202 located in a different PLMN. SEPP 126A intercepts the access token request and determines at the request does not have an access token. In line 2 of the message flow diagram, SEPP 126A formulates and sends an access token request to NRF 100B located in the PLMN of the producer NF. Formulation of the access token request message will be described in further detail below. Lines 2 and 3 in FIG. 5 illustrate the forwarding of the access token request to NRF 100B. NRF 100B validates consumer NF 200, generates an access token response including the access token, and, in lines 4 and 5, sends the access token response to the network of consumer NF 200 via SEPPs 126B and 126A. Instead of forwarding the access token response to consumer NF 200, SEPP 126A intercepts the access token response, extracts the access token from the response, and inserts the access token in the SBI service request message received in line 1. In lines 6 and 7, SEPP 126A forwards the SBI service request to producer NF 202 with the access token. Producer NF 202 validates the service request using the access token, and, in lines 8-10, generates and sends an SBI service response message to consumer NF 200. Thus, FIG. 5 illustrates the case where SEPP 126A functions as an OAuth 2.0 authorization client proxy on behalf of a consumer NF that does not support OAuth 2.0 authorization.

Figure 6:
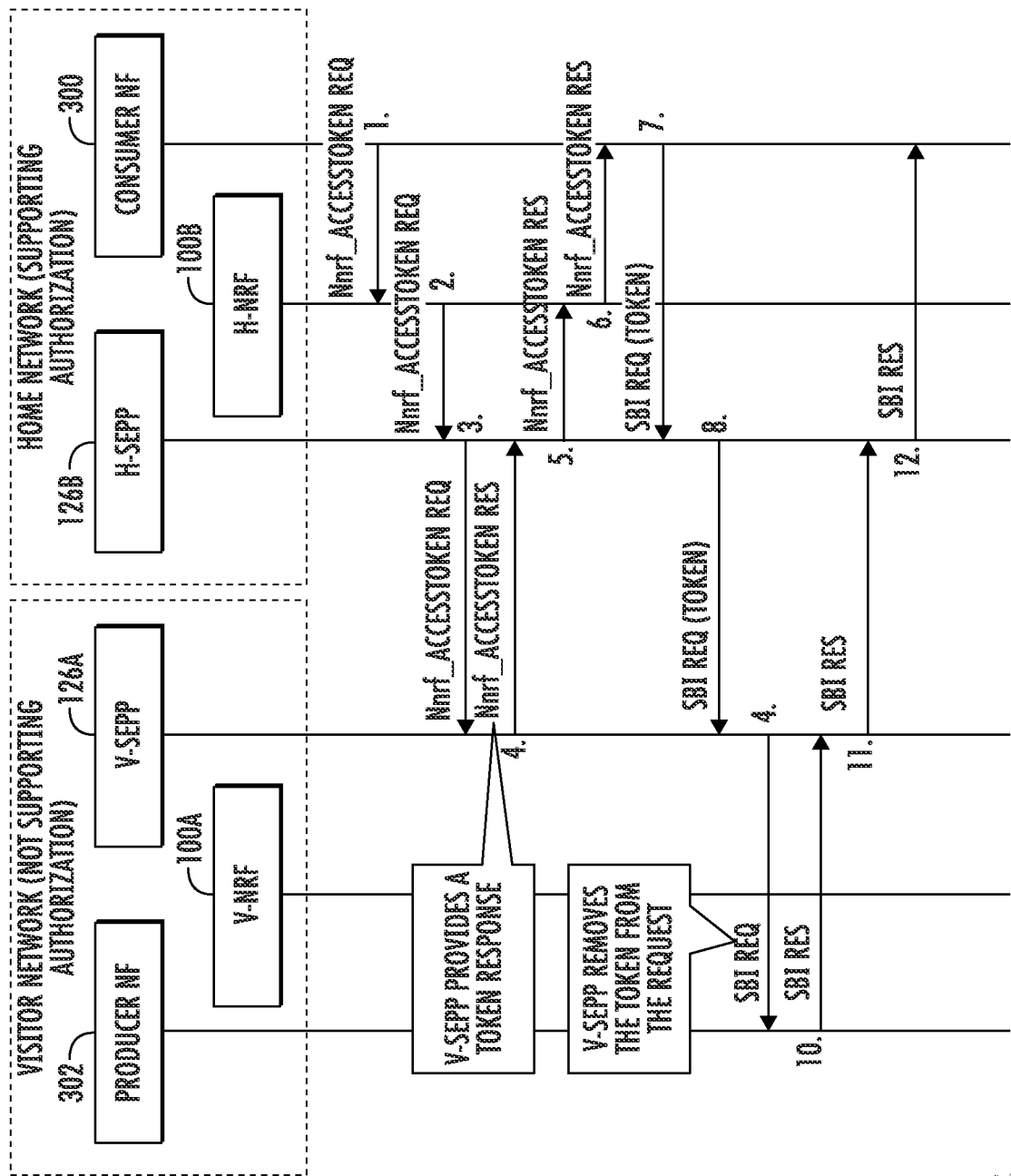
FIG. 6 is a message flow diagram illustrating exemplary messages exchanged when a SEPP operates as an OAuth 2.0 authorization server proxy on behalf of an NRF that does not support OAuth 2.0 authorization.

In another example, SEPP 126A may function as an access token authorization server. This example is illustrated in FIG. 6. Referring to FIG. 6, in line 1, consumer NF 300 generates an access token request message and forwards the access token request message to NRF 1008 located in the home network. NRF 1008, in lines 2 and 3, forwards the access token request message to NRF 100A located in the network where producer NF 302 resides. However, NRF 100A does not support OAuth 2.0 authorization. Accordingly, SEPP 126A intercepts the access token request message and generates in line 4 an access token response message on behalf of NRF 100A. The access token response message includes an access token generated by SEPP 126A using information local to SEPP 126A. The access token may be syntactically correct in that it includes all of the required access token claims. In lines 4-6, SEPP 126A forwards the access token to consumer NF 300.

In line 7, consumer NF 300 generates and sends an SBI service request to producer NF 302, and the service request includes the access token. In line 8, SEPP 126A receives the SBI service request and removes the access token from the service request since producer NF 302 does not support OAuth 2.0 authorization. In line 9, SEPP 126A forwards the service request to producer NF 302. In lines 10-12, producer NF 202 generates and sends an SBI service response message to consumer NF 300. Thus, FIG. 6 illustrates the case where SEPP 126A functions as an OAuth 2.0 authorization server proxy on behalf of an NRF that does not support OAuth 2.0 authorization.

Figure 7:
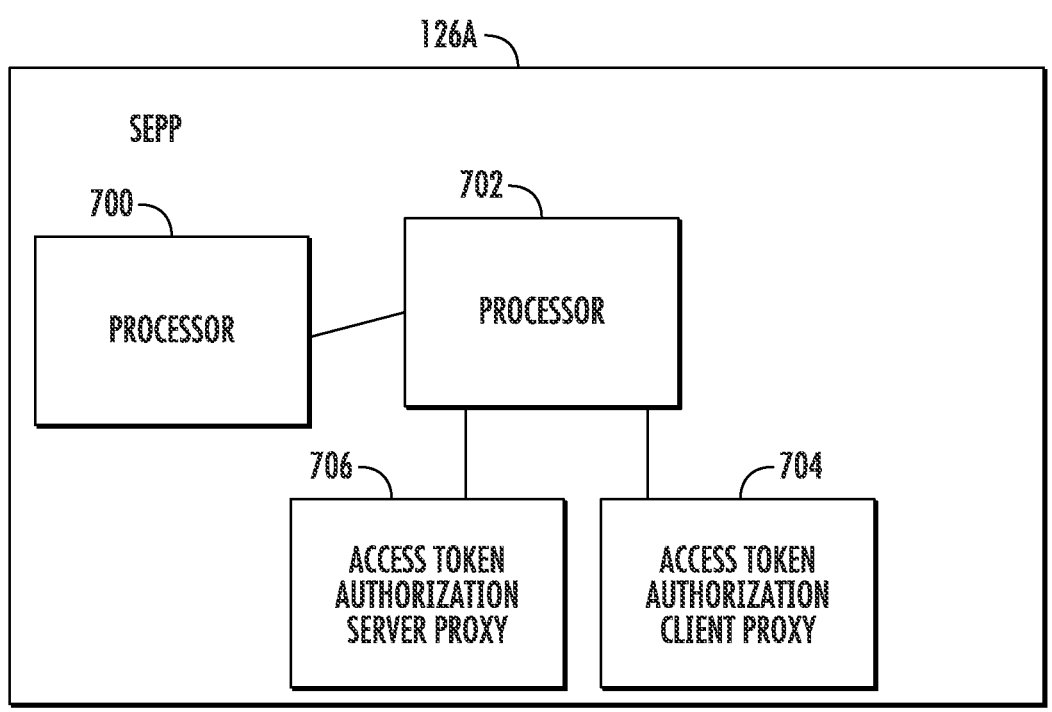
FIG. 7 is a block diagram illustrating a SEPP capable of performing delegated OAuth 2.0 authorization on behalf of NF service consumers and NRFs that do not support OAuth 2.0 authorization.

FIG. 7 is a block diagram illustrating an exemplary architecture for a SEPP that supports OAuth 2.0 authorization proxying as described herein. Referring to FIG. 7, SEPP 126A includes at least one processor 700 and a memory 702. SEPP 126A further includes an access token authorization client proxy 704 for performing the operations described above with regard to FIG. 5 of obtaining an OAuth 2.0 access token on behalf of a consumer NF that does not support OAuth 2.0 authorization and modifying the SBI service request message to include the OAuth 2.0 access token to enable the consumer NF to access the service provided by the producer NF that supports OAuth 2.0 authorization. SEPP 126A further includes access token authorization server proxy 706 that performs the functions of an OAuth 2.0 authorization server on behalf of an NRF that does not support OAuth 2.0 authorization, as described above with regard to FIG. 6. Access token authorization server proxy 706 may also remove access tokens from service request messages destined for producer NFs that do not support access-token-based authorization. Access token authorization client proxy 704 and access token authorization server proxy 706 may be implemented using computer executable instructions stored in memory 702 that cause processor 700 to perform the access token authorization client and server proxying operations described above.

Figure 8A:
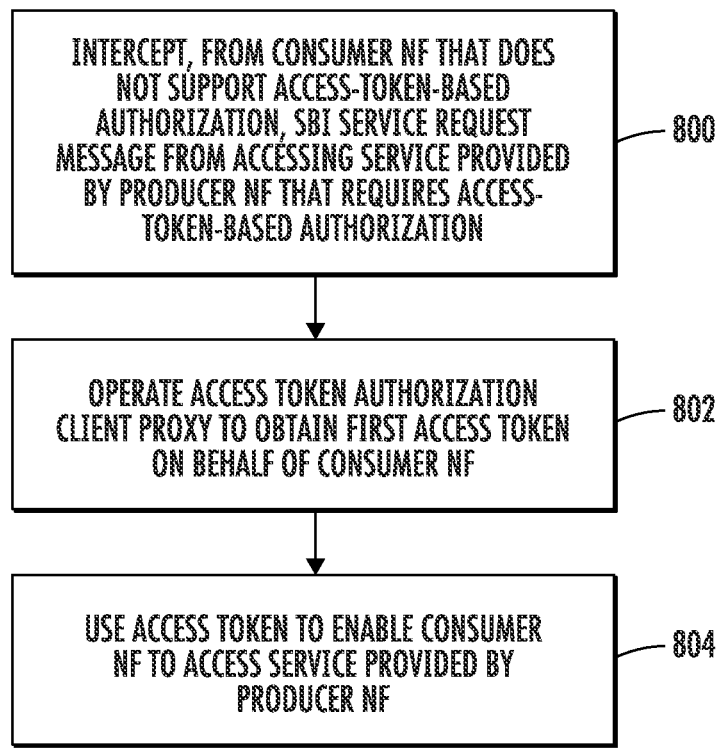
FIG. 8A is a flow chart illustrating an exemplary process of performing delegated OAuth 2.0 authorization on behalf of a consumer NF that does not support OAuth 2.0 authorization.

FIG. 8A is a flow chart illustrating an exemplary overall process for performing delegated authorization at a SEPP where the SEPP function as an access token authorization client proxy. Referring to FIG. 8A, in step 800, the process includes intercepting, from a consumer NF that does not support access token-based authorization, an SBI service request for accessing a service provided by a producer NF that requires access-token-based authorization. For example, SEPP 126A may receive an SBI service request from consumer NF 200 for accessing a service provided by producer NF 202.

Figure 8B:
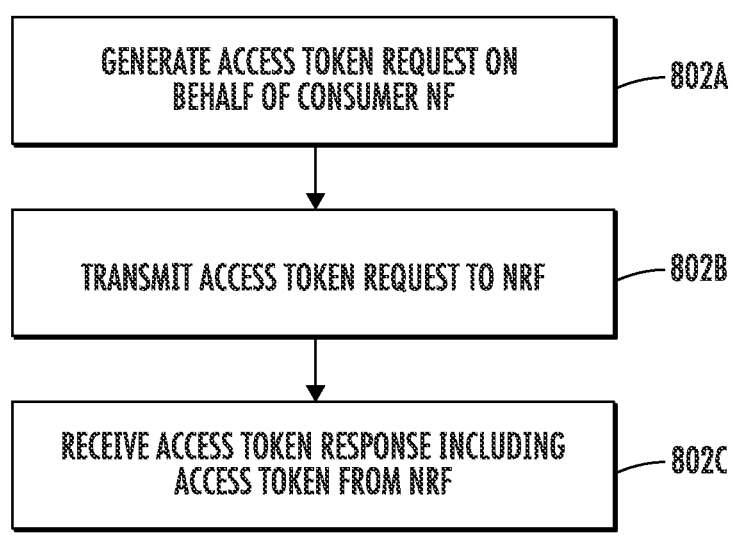
FIG. 8B is a flow chart illustrating in more detail the step from FIG. 8A of operating as an access token authorization client proxy on behalf of a consumer NF that does not support OAuth 2.0 authorization.

In step 802, the process includes operating as an access token authorization client proxy to obtain an access token on behalf of the consumer NF. For example, SEPP 126A may function as an OAuth 2.0 authorization client proxy to obtain an access token on behalf of consumer NF 200 that does not support OAuth 2.0 authorization. FIG. 8B illustrates additional details of step 802 in FIG. 8A. Referring to FIG. 8B, in step 802A, the process includes generating an access token request message on behalf of the consumer NF. Table 1 shown below illustrates attributes that must be included in an access token request message.

TABLE 1

| Access Token Request Attributes | | |
|---|---|---|
| Attribute name | Data type | Extracted From |
| grant_type | string | client_credentials |
| nfInstanceId | NfInstanceId | User-Agent header present in 5GC SBI request |
| nfType | NFType | User-Agent header present in 5GC SBI request |
| targetNfType | NFType | API name from R-URI |
| scope | string | Service Name from R-URI |
| requesterPlmn | PlmnId | From SCP configuration |
| targetPlmn | PlmnId | From Target FQDN |

The minimum set of attributes that must be included in an access token request are the grant type, the NF instance ID, the NF type, the target NF type, the scope, the requester PLMN, and the target PLMN. The grant type attribute may be obtained from consumer NF credentials populated from the SBI service request message. The NF instance ID may be populated from the user agent header of the SBI service request message. According to 3GPP TS 29.500, section 5.2.2, the user agent header is a mandatory header in an SBI service request message. Table 2 shown below illustrates the structure of the user agent parameter.

TABLE 2

| User Agent Parameter | | |
|---|---|---|
| User-Agent | IETF RFC 7231 [11] | This header shall be mainly used to identity the NF type of the HTTP/2 client. The pattern of the content should start with the value of NF type (e.g. udm, see NOTE 1) and followed by a "-" and any other specific information if needed afterwards. |

As indicated in Table 2, the user agent parameter may contain information that identifies the NF instance, such as the NF instance ID. SEPP 126A may extract the NF instance ID from the user agent header of the SBI service request message and use that information to populate the NF instance ID attribute of the access token request message. Similarly, the NF type may also be obtained from the user agent header of the SBI service request message.

Returning to Table 1, the requester PLMN of the access token request may be populated based on a configured requester PLMN parameter of SEPP 126A. The target PLMN attribute may be populated from the API name extracted from the requester uniform resource identifier (R-URI) of the SBI service request message. The scope attribute of the access token request may be populated from the service name extracted from the R-URI of the SBI service request message.

Returning to FIG. 8B, once the access token request is formulated, in step 802B, SEPP 126A transmits the access token request to the NRF. For example, SEPP 126A may transmit the access token request message to NRF 1008 located in the PLMN where producer NF 202 is located.

In step 802C, the process includes receiving the access token response including the access token from the NRF. For example, SEPP 126A may receive the access token response including the access token from NRF 1008.

Figure 8C:
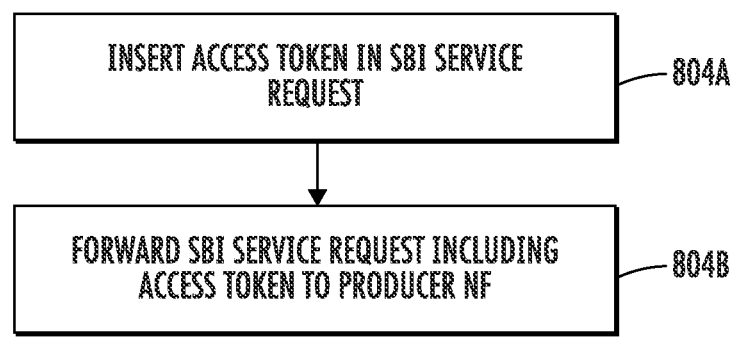
FIG. 8C is a flow chart illustrating in more detail the step from FIG. 8A of using an access token to enable a consumer NF that does not support OAuth 2.0 authorization to access a service provided by a producer NF that requires OAuth 2.0 authorization.

Returning to FIG. 8A, in step 804, the process includes using the first access token to enable the consumer NF to access the service provided by the producer NF. FIG. 8C illustrates additional details of step 804 in FIG. 8A. Referring to FIG. 8C, in step 804A, the process includes inserting the access token into the SBI service request message. For example, SEPP 126A may insert the access token that it obtained from NRF 1008 in the service request message that it intercepted from consumer NF 200.

In step 804B, the process includes forwarding the SBI service request including the first access token to the producer NF. For example, SEPP 126A may forward the SBI service request including the access token to producer NF 202. Producer NF 202 will then authorize the service request using the access token and respond to the service request. SEPP 126A will forward the response to consumer NF 200. Thus, FIGS. 8A-8C illustrate delegated authorization by a SEPP where the SEPP functions as an access token authorization client proxy, which, in the examples described herein, is an OAuth 2.0 authorization client proxy.

Figure 9A:
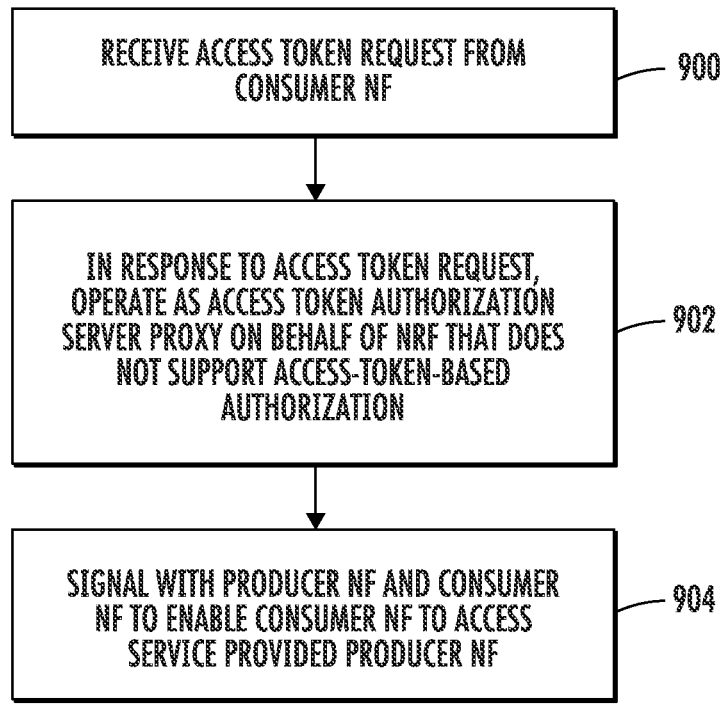
FIG. 9A is a flow chart illustrating an exemplary process for operating as an OAuth 2.0 authorization server proxy on behalf of an NRF that does not support OAuth 2.0 authorization and facilitating access to a service when a consumer NF supports OAuth 2.0 authorization and a producer NF does not support OAuth 2.0 authorization.

FIG. 9A illustrates an exemplary delegated authorization process performed by a SEPP that functions as an access token authorization server proxy on behalf of an NRF that does not support access token authorization. Referring to FIG. 9A, the process includes, in step 900, receiving an access token request from a consumer NF. For example, SEPP 126A receives an access token request from consumer NF 300.

Figure 9B:
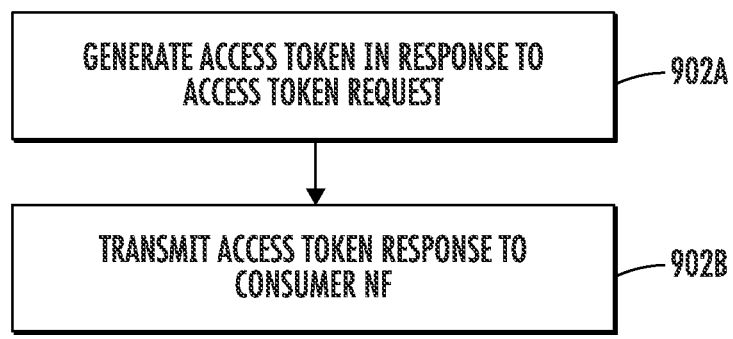
FIG. 9B is a flow chart illustrating in more detail the step from FIG. 9A of operating as an OAuth 2.0 authorization server proxy on behalf of an NRF that does not support OAuth 2.0 authorization.

In step 902, the process includes, in response to the access token request, operating as an access token authorization server proxy on behalf of the NRF that does not support access-token-based authorization. Step 902 is illustrated in further detail in FIG. 9B. Referring to FIG. 9B, in step 902A, the process includes generating an access token in response to the access token request. For example, SEPP 126A may generate an access token including the required claims specified in IETF RFC 6749. The access token may be syntactically correct according to the format and content specified in IETF RFC 6749. However, it is not necessary that the access token be a real access token and can be a dummy access token with syntactically correct fields because, as will be described below, SEPP 126A will remove the access token from service request messages before forwarding the service request messages to the producer NF that doesn't support access-token-based authorization.

In step 902B, the process includes transmitting an access token response to the consumer NF. For example, SEPP 126A may transmit an access token response including the access token generated in step 902A to requesting consumer NF 300.

Figure 9C:
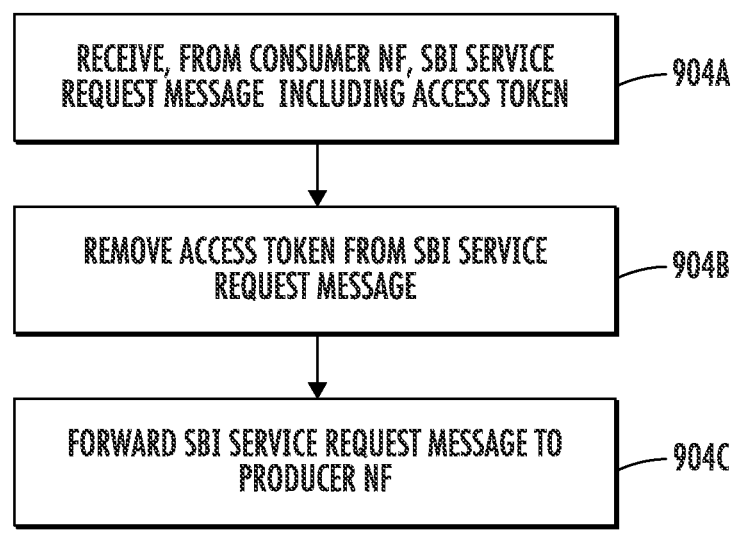
FIG. 9C is a flow chart illustrating in more detail the step from FIG. 9A of signaling with the producer NF and the consumer NF to enable the consumer NF to access the service provided by the producer NF when the consumer NF supports OAuth 2.0 authorization and the producer NF does not support OAuth 2.0 authorization.

Returning to FIG. 9A, in step 904, the process includes signaling with the producer NF and the consumer NF to enable the consumer NF to access the service. Step 904 is illustrated in more detail in FIG. 9C. Referring to FIG. 9C, the process of signaling with the consumer NF and the producer NF includes, in step 904A, receiving, from the consumer NF, an SBI service request including the access token. For example, SEPP 126A may receive an SBI service request from NF service consumer 300 including the NF access token that SEPP 126A generated.

In step 904B, the process includes removing the access token from the SBI service request. In step 904C, the process includes forwarding the SBI service request to the producer NF. Thus, FIGS. 9A-9C illustrate exemplary steps that may be performed by a SEPP in functioning as an access token authorization server proxy and signaling intermediary on behalf of an NRF that does not support access token based authorization.

Exemplary advantages of the subject matter described herein include improved interoperability between PLMNs where one PLMN supports access token based authorization and another PLMN does not. Providing the solution at a SEPP is beneficial, as a SEPP sits at the border between networks. It is also a scalable solution as a single SEPP can perform the functions described herein for or on behalf of consumer and producer NFs.

The disclosure of each of the following references is hereby incorporated herein by reference in its entirety.

REFERENCES

1. Hardt, D. "The OAuth 2.0 Authorization Framework," IETF RFC 6749 (October 2012).
2. 3GPP TS 33.501 V17.0.0 (2020-12), $3^{rd}$ Generation Partnership Project; Technical Specification Group Services and System Aspects; Security architecture and procedures for 5G system (Release 17).
3. 3GPP TS 29.500 V17.1.0 (2020-12); $3^{rd}$ Generation Partnership Project; Technical Specification Group Core Network and Terminals; 5G System; Technical Realization of the Service Based Architecture; Stage 3 (Release 17).
4. 3GPP TS 29.510 V17.0.0 (2020-12); $3^{rd}$ Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for delegated authorization at a security edge protection proxy (SEPP), the method comprising:
   at a SEPP including at least one processor and a memory:
      intercepting, by the SEPP and from a first consumer network function (NF) separate from the SEPP and that does not support access-token-based authorization, a first service based interface (SBI) service request lacking an access token and for accessing a service provided by a first 5G producer NF that requires access-token-based authorization;
      operating, by the SEPP, as an access token authorization client proxy to obtain a first access token on behalf of the first consumer NF, wherein operating as the access token authorization client proxy includes signaling, by the SEPP and with an NF repository function (NRF) that operates as an access token authorization server, to obtain the first access token from the NRF, wherein the NRF is a 5G NRF separate from the SEPP that stores NF profiles of producer NFs registered with the NRF and signaling with the NRF to obtain the first access token includes:

generating, by the SEPP, an access token request on behalf of the first consumer NF;

transmitting the access token request from the SEPP to the 5G NRF that is separate from the SEPP; and receiving, by the SEPP and from the 5G NRF that is separate from the SEPP and upon successful validation of the access token request by the 5G NRF, an access token response including the first access token; and using the first access token to enable the first consumer NF to access the service provided by the first producer NF, wherein using the first access token to access the service provided by the first producer NF includes inserting, the first access token in the first SBI request and forwarding, by the SEPP, the first SBI request to the first producer NF.

2. The method of claim 1 wherein generating the access token request includes extracting values for at least some attributes to be included in the access token request from a user agent header of the first SBI service request.

3. The method of claim 2 wherein extracting values for at least some of the attributes includes extracting an NF instance ID of the first consumer NF from the user agent header of the first SBI service request.

4. The method of claim 1 wherein using the first access token to enable the first consumer NF to access the service provided by the first producer NF includes:

receiving, by the SEPP, an SBI service response from the first producer NF; and forwarding, by the SEPP, the SBI service response to the first consumer NF.

5. The method of claim 1 comprising:

receiving, by the SEPP and from a second consumer NF separate from the SEPP, an access token request;

operating, by the SEPP, as an access token authorization server proxy on behalf of an NRF that does not support access token authorization in response to the access token request from the second consumer NF; and signaling, by the SEPP and with the second consumer NF and a second producer NF to enable the second consumer NF to access a service provided by the second producer NF.

6. The method of claim 5 wherein operating as an access token authorization server proxy comprises:

generating, by the SEPP and in response to the access token request, a second access token; and transmitting, by the SEPP and to the second consumer NF, an access token response including the second access token.

7. The method of claim 6 wherein signaling, by the SEPP and with the second producer NF to enable the second consumer NF to access the service provided by the second producer NF includes:

receiving, by the SEPP and from the second consumer NF, a second SBI service request including the second access token;

removing, by the SEPP, the second access token from the second SBI service request;

forwarding, by the SEPP, the second SBI service request to the second producer NF;

receiving, by the SEPP, an SBI service response from the second producer NF; and forwarding, by the SEPP, the SBI service response to the second consumer NF.

8. The method of claim 6 wherein generating the second access token includes generating an OAuth 2.0 access token comprising a dummy access token with syntactically correct claims.

9. A system for delegated authorization at a security edge protection proxy (SEPP), the system comprising:

a SEPP including at least one processor and a memory; and an access token authorization client proxy implemented by the at least one processor for intercepting, from a first consumer network function (NF) separate from the SEPP and that does not support access-token-based authorization, a first service based interface (SBI) service request lacking an access token and for accessing a service provided by a first producer NF that requires access-token-based authorization, obtaining the first access token on behalf of the first consumer NF, and using the first access token to enable the first consumer NF to access the service provided by the first producer NF, wherein obtaining the first access token on behalf of the first consumer NF includes signaling with an NF repository function (NRF) that operates as an access token authorization server, to obtain the first access token from the NRF, wherein the NRF is a 5G NRF separate from the SEPP that stores NF profiles of producer NFs registered with the NRF and signaling with the NRF to obtain the first access token includes:

forwarding request to additional separate NRF, If required, for validation;

generating an access token request on behalf of the first consumer NF;

transmitting the access token request to the NRF; and receiving, from the NRF, an access token response including the first access token and the access token authorization client proxy is further configured for using the first access token to access the service provided by the first producer NF by inserting, the first access token in the first SBI request and forwarding, the first SBI request to the first producer NF.

10. The system of claim 9 wherein the access token authorization client proxy is configured to generate the access token request by extracting values for at least some attributes to be included in the access token request from a user agent header of the first SBI service request.

11. The system of claim 10 wherein the values extracted by the access token authorization client proxy include an NF instance ID of the first consumer NF from the user agent header of the first SBI service request.

12. The system of claim 9 wherein the access token authorization client proxy is configured to use the first access token to enable the first consumer NF to access the service by:

receiving an SBI service response from the first producer NF; and forwarding the SBI service response to the first consumer NF.

13. The system of claim 9 comprising an access token authorization server proxy executable by the at least one processor for receiving, from a second consumer NF separate from the SEPP, an access token request; operating as an access token authorization server on behalf of an NRF that does not support access token authorization in response to the access token request from the second consumer NF; and signaling with the second consumer NF and a second producer NF to enable the second consumer NF to access a service provided by the second producer NF.

14. The system of claim 13 wherein, in operating as the access token authorization server, the access token authorization server proxy is configured to:
generate, in response to the access token request, a second access token; and
transmit, to the second consumer NF, an access token response including the second access token.

15. The system of claim 13 wherein the access token authorization server proxy is configured to signal with the second consumer NF and the second producer NF to enable the second consumer NF to access the service provided by the second producer NF by:
receiving, from the second consumer NF, a second SBI service request including the second access token;
removing the second access token from the second SBI service request;
forwarding the SBI service request to the second producer NF;
receiving an SBI service response from the second producer NF; and
forwarding the SBI service response to the second consumer NF.

16. A non-transitory computer readable medium having stored thereon executable instructions that when executed by a processor of a computer controls the computer to perform steps comprising:
intercepting, by a security edge protection proxy (SEPP) and from a consumer network function (NF) separate from the SEPP and that does not support access token based authorization, a service based interface (SBI) service request lacking an access token and for accessing a service provided by a producer NF that requires access token based authorization;
operating, by the SEPP, as an access token authorization client proxy to obtain a first access token on behalf of the consumer NF, wherein operating as the access token authorization client proxy includes signaling, by the SEPP and with an NF repository function (NRF) that operates as an access token authorization server, to obtain the first access token from the NRF, wherein the NRF is a 5G NRF separate from the SEPP that stores NF profiles of producer NFs registered with the NRF and signaling with the NRF to obtain the first access token includes:
forwarding request to additional separate NRF, if required, for validation;
generating, by the SEPP, an access token request on behalf of the first consumer NF;
transmitting the access token request from the SEPP to the NRF; and
receiving, by the SEPP and from the NRF, an access token response including the first access token; and
using the first access token to enable the consumer NF to access the service provided by the producer NF, wherein using the first access token to access the service provided by the first producer NF includes inserting, by the SEPP, the first access token in the first SBI request and forwarding, by the SEPP, the first SBI request to the first producer NF.

* * * * *